United States Patent [19]
Ogawa

[11] Patent Number: 5,468,551
[45] Date of Patent: Nov. 21, 1995

[54] FUNCTIONAL LAMINATED CHEMICALLY ADSORBED FILMS

[75] Inventor: Kazufumi Ogawa, Hirakata, Japan

[73] Assignee: Matsushita Electric Industrial Co., Ltd., Japan

[21] Appl. No.: 217,029

[22] Filed: Mar. 24, 1994

Related U.S. Application Data

[63] Continuation of Ser. No. 872,166, Apr. 22, 1992, abandoned.

[30] Foreign Application Priority Data

Apr. 30, 1991 [JP] Japan ................................. 3-098917

[51] Int. Cl.$^6$ ............................................. B32B 7/04
[52] U.S. Cl. ........................... 428/333; 428/446; 428/447
[58] Field of Search ................................. 428/333, 446, 428/447

[56] References Cited

U.S. PATENT DOCUMENTS

| | | |
|---|---|---|
| 4,539,061 | 9/1985 | Sagiv ................................. 156/278 |
| 4,761,316 | 8/1988 | Ogawa ................................. 428/64 |
| 5,057,339 | 10/1991 | Ogawa ................................. 427/340 |

FOREIGN PATENT DOCUMENTS

| | | |
|---|---|---|
| 0351092 | 1/1990 | European Pat. Off. . |
| 0385656 | 5/1990 | European Pat. Off. . |

*Primary Examiner*—D. S. Nakarani
*Attorney, Agent, or Firm*—Fish & Richardson

[57] ABSTRACT

According to the invention, molecules having conductive, photofunctional and other functions are secured by chemical bonds to a substrate via a chemically adsorbed monomolecular film by an adsorption process. The process comprises a step of contacting the substrate with a non-aqueous solution containing a material. The material includes a straight chain molecules having a plurality of chlorosilyl groups at both ends. A reaction occures between hydroxyl groups on the substrate surface and chlorosilyl groups at one of the ends of the material having the chlorosilyl groups. Prior to the reaction the substrate is washed with a non-aqueous organic solution by dipping the substrate in a non-aqueous solution containing molecules having a specific function for causing the reaction of the molecules with the chlorosilyl groups at the other end of the molecules having the chlorosilyl groups, thereby securing the molecules to the surface of the substrate.

8 Claims, 2 Drawing Sheets

FUNCTIONAL LAMINATED CHEMICALLY ADSORBED FILMS

This application is a continuation of Ser. No. 07/872,166, filed Apr. 22, 1992, now abandoned.

FIELD OF THE PRESENT INVENTION

The present invention relates to a functional chemically adsorbed film in which functional molecules are secured by chemical bonds to an outer layer of a chemically adsorbed monomolecular film,-and to a method of manufacturing the films. It further relates to a method of laminating a functional chemically adsorbed monomolecular film to a monomolecular inner film, and also to materials for chemical adsorption to this end.

BACKGROUND OF THE INVENTION

In the fields of electronic parts and precision image processing, it is useful to incorporate, into thin coating films, fine area conductive groups, photofunctional groups and other functional molecules for high density recording, high response speed switching and so forth.

It has been proposed to produce functional chemically adsorbed films by preliminarily incorporating functional groups having specific functions in materials for chemical adsorption and then causing the chemical adsorption, as disclosed in, for example, U.S. Pat. No. 4,673,474.

However, the prior art silicone-based resin coating film is merely in contact with the substrate surface, and therefore problems arise in that the film has low hardness and an inferior scratch-resistant property.

Further, it has been difficult to introduce functional groups having specific functions into materials for chemical adsorption, thus imposing great limitations on the preparation of the chemical adsoprtion materials having the desired functions.

SUMMARY OF THE INVENTION

In the light of the foregoing, it is an object of the invention to provide a method of manufacturing chemically adsorbed films having desirable functions, together with richly versatile formation techniques of a molecular structure and functional chemically adsorbed films.

It is preferable in this invention to form a chemically adsorbed functional film comprising functional molecules having functional organic groups, the molecules being covalently bonded through a —Si— group.

It is preferable in this invention that the film is formed as a laminated outer layer and that an inner layer is directly or indirectly bonded by covalent bonds to the substrate surface.

It is preferable in this invention that the organic groups in the outer layer be selected from the group consisting of conductive groups and photofunctional groups.

It is preferable in this invention that the organic groups in the outer layer are selected from the group consisting of aromatic compounds, substituted aromatic compounds, heterocyclic compounds and substituted heterocyclic compounds.

It is preferable in this invention that the molecules of the functional film or the inner layer are represented by the formula:

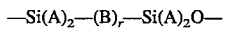

(where r represents an integer in a range from 1 to 30, A represents a lower-alkyl group, a lower-alkoxyl group or an aryl group, and B represents a chain segment, an oxygen-containing chain segment, a nitrogen-containing chain segment, a silicon-containing chain segment, an aromatic segment, a substituted aromatic segment, a heterocyclic segment, or a substituted heterocyclic segment).

It is preferable in this invention that the molecules of the functional film or the inner layer are selected from a group consist of the formula:

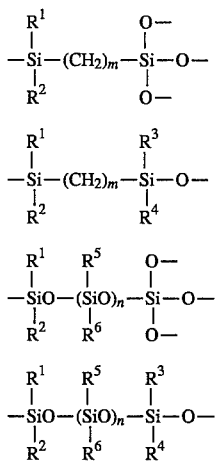

(where $R^1$, $R^2$, $R^3$, $R^4$, $R^5$, $R^6$ represent a lower-alkyl group with a carbon number of 1 to 6, a lower-alkoxyl group or an aryl group, m and n are an integer in a range from 1 to 30).

Another object of the invention is to provide a method of manufacturing a functional film by a chemical adsorption process comprising the steps of:

(A) contacting the surface of a substrate with an adsorption solution prepared by dissolving a surface active material in a non-aqueous solution to bring about a chemical adsorption reaction, the surface active material having a reactive group at least at one end and a functional group at least at another end;

(B) washing non-reacted materials away from the substrate surface using a non-aqueous solution; and (C) contacting the hydrophilic substrate after the monomolecular layer formation step with a solution containing molecules having a specific function to cause a reaction between the reaction site molecular group of the surface active material and the molecules having the specific function.

It is preferable in this invention that the reactive group of the surface active material forming the outer layer is at least one member selected from the group consisting of a halosilyl group, an alkoxysilyl group, a silylidine group, a halotitanium group, and an alkoxyl titanium group.

It is preferable in this invention that the surface active material is represented by the formula:

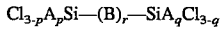

(where p and q represent an integer ranging from 0 to 2, r represents an integer ranging from 1 to 30, A represents a lower-alkyl group, a lower-alkoxyl group or an aryl group, and B represents a functional group selected from the group consisting of a chain segment, an oxygen-containing chain segment, a nitrogen-containing chain segment, a silicon-containing chain segment, an aromatic segment, a substituted aromatic segment, a heterocyclic segment, and a substituted heterocyclic segment).

It is preferable in this invention that the surface active material is selected from the group consisting of the formula:

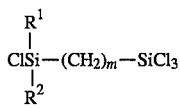

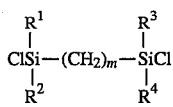

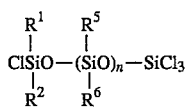

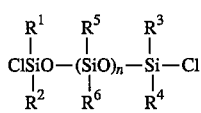

(where $R^1$, $R^2$, $R^3$, $R^4$, $R^5$, $R^6$ represent a lower-alkyl group with a carbon number of 1 to 6, lower-alkoxyl group or an aryl group, m and n are an integer in a range from 1 to 30).

A further object of the invention is to provide a method of manufacturing a functional laminated film by a chemical adsorption process comprising the steps of:

(a) dissolving a surface active material having reactive molecular groups at opposite ends of the material, in a non-aqueous solvent to form an adsorption solution, and contacting a substrate having surface active hydrogen groups with said adsorption solution to bring about a chemical adsorption reaction;

(b) washing non-reacted materials away from the substrate surface using a non-aqueous solution;

(c) reacting the chemically adsorbed surface active material with water to form an inner layer;

(d) contacting the surface of the inner layer with an adsorption solution prepared by dissolving a surface active material in a non-aqueous solution to bring about a chemical adsorption reaction, the surface active material having a reactive molecular group at least at one end and a functional molecular group at least at another end;

(e) washing non-reacted materials away from the substrate surface using a non-aqueous solution; and (f) contacting the hydrophilic substrate after the monomolecular layer formation step with a solution containing molecules having a specific function to cause a reaction between the reaction site molecular group of the surface active material and the molecules having the specific function.

In the functional chemically adsorbed film according to the invention, functional molecules are secured by chemical bonds onto a substrate or via an inner layer onto the substrate. With this structure, an increased freedom of incorporation of functional molecules can be obtained compared to the prior art of incorporating functional groups into materials for chemical adsorption. It is also possible to obtain a functional laminated chemically adsorbed film having a desired function comparatively freely. In addition, it is possible to obtain a functional single or laminated chemically adsorbed film, which is thin and durable.

DETAILED DESCRIPTION OF THE INVENTION

Figure 1:
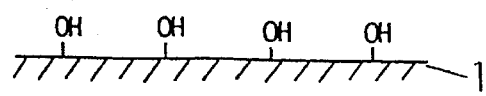
FIGS. 1 (a)–(d) show a substrate surface for explaining a method of manufacturing a photo functional thin film as in example 1 of the invention.
Figure 1:
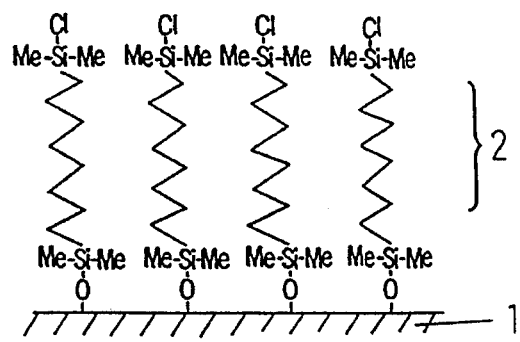
Figure 1:
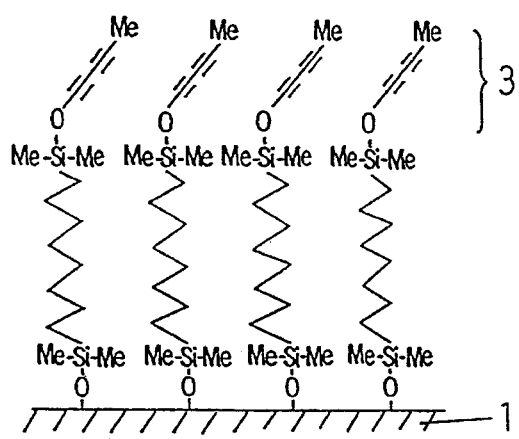
Figure 1:
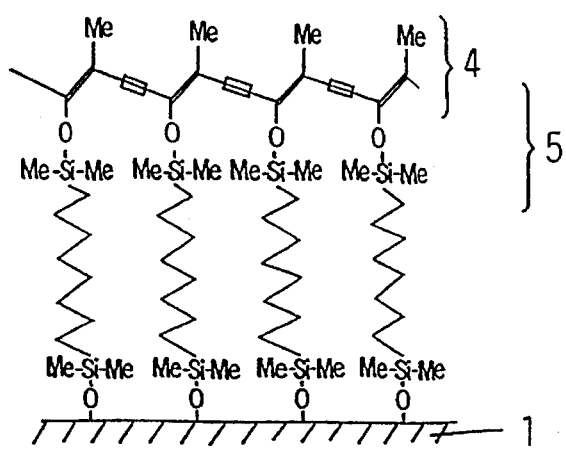

According to the invention, a functional single or laminated chemically adsorbed film is provided in which molecules having a specific function are secured by chemical bonds to a chemically adsorbed monomolecular film formed on a substrate. A method of manufacturing this functional laminated chemically adsorbed film comprises a chemical adsorption step of contacting a hydrophilic substrate with a non-aqueous solution containing a surface active material, having an adsorption site molecular group at one end and a reaction site molecular group at another end; a monomolecular layer formation step of washing non-adsorbed surface active material away from the hydrophilic substrate using a non-aqueous solution subsequent to the chemical adsorption step; and a reaction step of contacting the hydrophilic substrate after the monomolecular layer formation step with a solution containing molecules having a specific function to cause a reaction between the reaction site molecular group of the surface active material and the molecules having the specific function.

The surface active material used according to the invention may be any material having, at one end, an adsorption site molecular group for chemical adsorption to the substrate and, at another end, a reaction site molecular group for reaction with the molecules having a specific function. Examples of the adsorption site group are a halosilyl (X—Si—, X representing a halogen) group, an alkoxysilyl (ROSi—, R representing an alkyl group), an adsorptive silicon group such as silicon hydride (HSi—) group, and an adsorptive titanium group such as a halotitanium (X—Ti—, X representing a halogen) group and an alkoxy titanium (RO—Ti—, R representing an alkyl group) group. These adsorption site groups are also examples of the reaction site group.

For the functional laminated chemically adsorbed film according to the invention, it is required that reaction sites are arranged regularly on the hydrophilic substrate. To this end, the surface active material is suitably regularly adsorbed in the form of a monomolecular layer or a laminated monomolecular layer. In addition, the chemically adsorbed film suitably is monomolecular and has a high concentration. Further, adsorption site groups in which the adsorption reaction proceeds at a temperature lower than, for example, room temperature are preferred over those which require heating for the reaction. The preferred adsorption site group is typically a halosilyl group, particularly a chlorosilyl group which has both adsorption activity and stability.

The reaction site group is present on a monomolecular layer chemically adsorbed to the substrate, and therefore its reactivity need not be as strong as the activity of the adsorption site group. However, the higher the reactivity, the more complete reaction with molecules having a specific function can be obtained. For this reason, the reaction site group is suitably a halosilyl group, particularly a chlorosilyl group for the same reasons as for the adsorption site group.

The chemical structure of a suitable surface active material is represented as

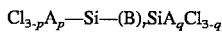

(where p and q represent an integer ranging from 0 to 2, r represents an integer (i.e., natural number) ranging from 1 to 30, A represents a lower-alkyl group (e.g., methyl group, ethyl group, isopropyl group, etc.), or an alkoxy group (e.g., methoxy group, ethoxy group, propoxy group, etc.), or aryl group, and B represents a functional group selected from the group consisting of a carbon chain (e.g., methylene chain, alkane chain, alkyne chain, etc.), an oxygen-containing carbon chain, such as an ester group, a nitrogen-containing carbon chain, compound such as amino or imino group in the chain compound, a silicon-containing carbon chain, compound segment of an organic silicon compound, in which silicon is contained in the chain compound, an aromatic segment (e.g., phenylene, naphthylene, etc.), a substituted aromatic segment (e.g., phenyl-methylene, methyl-phenylene, phenylene sulfide, etc.), a heterocyclic segment (e.g., pyrrole, thienyl, furan, carbazol, etc.), or a substituted heterocyclic segment (e.g., methylpyrrole, N-isopropylcarbazol, 3-methylenethienylene, etc.).

Where the surface active material has the above structure, the chemically adsorbed monomolecular layer in the functional laminated chemically adsorbed film according to the invention has a structure represented by the formula $$-Si(A)_2-(B)_r-Si(A)_2O-$$

The surface active material according to the invention desirably has a chemical structure represented as formulas [1] to [4]:

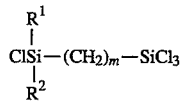

[Formula 1]

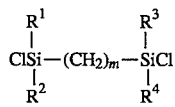

[Formula 2]

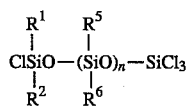

[Formula 3]

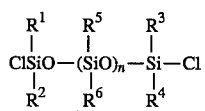

[Formula 4]

(where $R^1$, $R^2$, $R^3$, $R^4$, $R^5$, $R^6$ represent a lower-alkyl group with a carbon number of 1 to 6 or lower-alkoxyl group or an aryl group, m and n are an integer in a range from 1 to 30).

This is so because of capability of ready handling and ready availability. When the above surface active material is used, the chemically adsorbed monomolecular layer in the functional laminated chemically adsorbed film according to the invention has a structure represented by the formulas [5] to [8]:

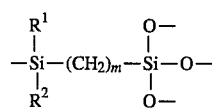

[Formula 5]

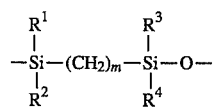

[Formula 6]

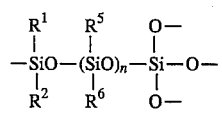

[Formula 7]

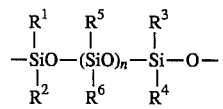

[Formula 8]

(where $R^1$, $R^2$, $R^3$, $R^4$, $R^5$, $R^6$ represent a lower-alkyl group with a carbon number of 1 to 6 or a lower-alkoxyl group or an aryl group, m and n are an integer in a range from 1 to 30).

Among the specific functions of functional molecules used according to the invention are such photofunctions as photoconductivity, non-linear optical properties, photochromic properties, optical cross-linking property and optically decomposing property, such thermofunctional properties as thermal reactivity and thermal conductivity and such electrofunctions as electric conductivity. Among such specific functions, the photofunctions and electrofunctions are preferred from the considerations of the structure of the functional laminated chemically adsorbed film according to the invention and applicability of the film to high concentration recording, high response speed switching, microarea electric conductivity and so forth.

According to the invention, a functional laminated chemically adsorbed film may be manufactured by a method, which comprises a step of contacting a well-washed hydrophilic substrate with a non-aqueous solution containing a material having a plurality of chlorosilyl groups at opposite ends, such as the compound

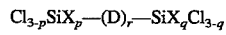

(where p and q represents an integer ranging from 0 to 2, r represents an integer ranging from 1 to 30 and D represents a siloxane chain having chloro atom). The method includes, dissolving a surface active material having reactive molecular groups at opposite ends of the material, in a non-aqueous solvent to form an adsorption solution, and contacting a substrate having surface active hydrogen groups with said adsorption solution to bring about a chemical adsorption reaction; washing non-reacted materials away from the substrate surface using a non-aqueous solution; reacting the chemically adsorbed surface active material with water to form an inner layer; reacting hydroxyl groups on the substrate surface with the chlorosilyl groups of the material containing chlorosilyl groups at its molecular ends to adsorb the material to the substrate surface; a subsequent step of washing excess material containing chlorosilyl groups away from the substrate using a non-aqueous organic solution and then dipping and holding the substrate in a non-aqueous solution containing molecule having a specific function (e.g., derivatives of pyrrole, thiophene, aniline, furan, acetylene, diacetylene, etc.) to react the chlorosilyl groups remaining on the surface with the molecules noted above, thereby securing the molecules to the substrate surface; and a subsequent step of removing excess molecules on the substrate surface by using a non-aqueous organic solution.

The chemically adsorbed film according to the invention is electrically conductive and exhibits non-linear optical effects. The chemically adsorbed film may be manufactured by selecting a compound having a functional group such as a —COOH group, —OH group, =NH group, —NH$_2$ group, epoxy group etc. Such compounds are preferably derivatives of acetylene, diacetylene, pyrrole, thiophene, aniline, furan, cyano, thiocyano, benzene, etc. To attach the compound to the substrate, a material containing a plurality of chlorosilyl groups at its molecular ends may be used as an inner layer. An example of such surface active material is the compound;

$$Cl_{3-p}SiX_p—(CH_2)_r SiX_qCl_{3-q}$$

(there p and q represent an integer ranging from 0 to 2, r represents an integer ranging from 1 to 30 (preferably ranging from 10 to 20). An example of the material containing two chlorosilyl groups at the molecular ends is the compound:

$$ClSi(CH_3)_2—(CH_2)_8—Si(CH_3)_2Cl.$$

An example in which the typical functional molecule is a diacetylene derivative is represented by the formula:

$$CH_3—C\equiv C—C\equiv C—OH.$$

An example in which the functional molecule is pyrrole. The material containing a plurality of chlorosilyl groups at the molecule ends is $$Cl_3SiO(SiCl_2O)_{n—SiCl3}$$

(where n represents an integer ranging from 1 to 20) will be given.

It is possible to use SiCl$_4$, SiHCl$_3$, Cl$_3$SiOSiCl$_3$ and Cl$_3$SiOSiCl$_2$OSiCl$_3$ in lieu of the material containing a plurality of chlorosilyl groups at the molecular ends.

EXAMPLE 1

A hydrophilic substrate 1 as shown in FIG. 1(a) has prepared. The substrate 1 may be a glass substrate or a Si substrate having an oxidized surface. It has dried well and then dipped and held for about to hours in a mixed solution of 80 wt. % cyclohexane (or n-hexadecanetruene or xylene or bicyclohexyl), 12 wt. % carbon tetrachloride and 8 wt. % chloroform, containing about 4 wt. % of $$ClSi(CH_3)_2—(CH_2)_8—Si(CH_3)_2Cl.$$

Since the surface of the hydrophilic substrate contained many hydroxyl groups, a hydrochloric acid elimination reaction (i.e., a dehydrochlorination reaction) was brought about between —SiCl groups at either molecular end of the material having chlorosilyl (—SiCl) groups and hydroxyl groups of the substrate surface, thus producing bonds represented by formula [9]:

$$\begin{array}{cc} CH_3 & CH_3 \\ | & | \\ ClSi—(CH_2)_8—SiO— \\ | & | \\ CH_3 & CH_3 \end{array} \quad \text{[Formula 9]}$$

over the entire substrate surface. A monomolecular layer 2, as shown in FIG. 1(b), was formed such that it was covalently bonded to the substrate surface. The covalent bond is via a siloxane bond.

Subsequently, the substrate was washed well using a non-aqueous solvent, e.g., chloroform. The formation of chemically adsorbed monomolecular film was measured by FTIR spectrometry and the thickness was about 1.5 nanometers (nm). It was firmly bonded such that it did not separate.

Then the substrate was dipped and held in a non-aqueous solution containing functional molecules, e.g., a chloroform solution prepared by dissolving a diacetylene compound represented by the formula:

$$CH_3—C\equiv C—C\equiv C—OH$$

to a concentration of about 5 wt. %, which brought about a dehydrochlorination reaction between —SiCl groups remaining on the substrate surface and —OH groups of the diacetylene compound. Thus, molecules represented by formula [10]:

$$\begin{array}{cccc} & & CH_3 & CH_3 \\ & & | & | \\ CH_3—C\equiv C—C\equiv C—O—Si—(CH_2)_8—SiO— \\ & & | & | \\ & & CH_3 & CH_3 \end{array} \quad \text{[Formula 10]}$$

and each having a diacetylene group 3 were secured by chemical bonds to the substrate via the chemically adsorbed monomolecular layer 2, as shown in FIG. 1(c).

Thereafter, the substrate was washed well with an organic solvent (i. e., a chloroform solution) and then irradiated with ultraviolet rays of about 100 mJ. Thus, a functional chemically adsorbed layer 5 was obtained, as shown in FIG. 1(d), which contained polyacetylene bonds produced with polymerization of adjacent diacetylene groups and had a tertiary non-linear optical effect.

EXAMPLE 2

In this example, pyrrol represented by formula [11]:

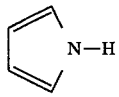

[Formula 11]

was selected as the functional molecule, and $$ClSi(CH_3)_2—(CH_2)_{10}—SiCl_3$$

was selected as the material having a plurality of chlorosilyl groups at its molecular ends.

Figure 2:
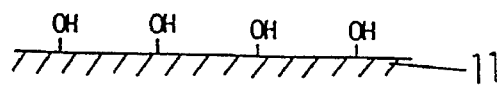
FIGS. 2 (a)–(d) show a substrate surface for explaining a method of manufacturing a functional thin film having electric conductivity as in example 2 of the invention.
Figure 2:
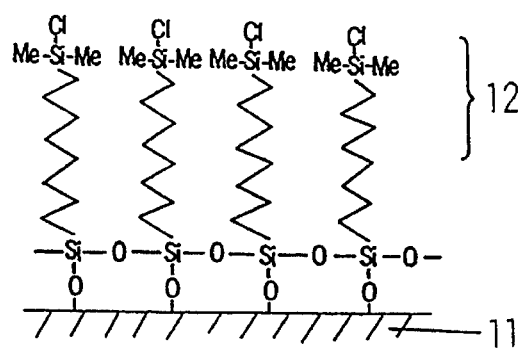
Figure 2:
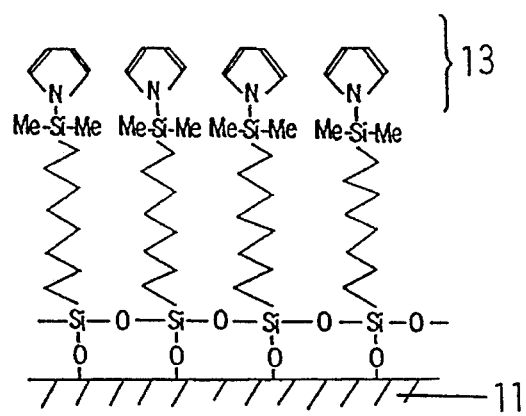
Figure 2:
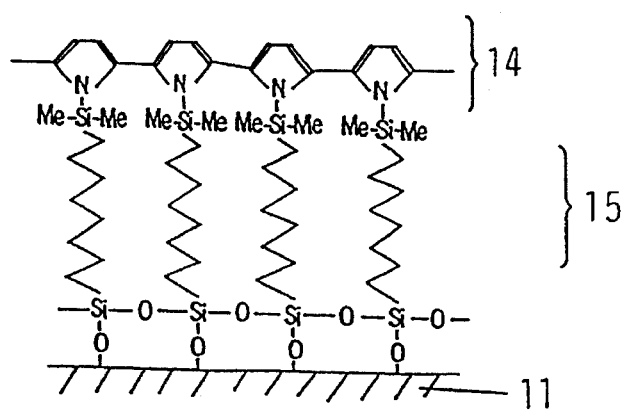

A hydrophilic substrate 11 (for example, a glass or a Si substrate) as shown in FIG. 2 (a) was prepared. Then, after a thorough drying, it was dipped and held for about two hours in a solution of 80 wt. % cyclohexane (or n-hexadecane or xylene or bicyclohexyl), 12 wt. % of carbon tetrachloride and 8 wt. % of chloroform, containing about 1 wt. % of $$ClSi(CH_3)_2—(CH_2)_{10}—SiCl_3$$

Since the surface of the hydrophilic substrate contained many hydroxyl groups, a dehydrochlorination reaction was brought about between —SiCl groups at either molecular end of the material containing chlorosilyl (—SiCl) groups and the hydroxyl groups of the substrate surface, thus forming bonds represented by the formula [12]:

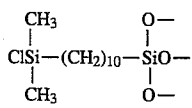

[Formula 12]

over the entire substrate surface. A monomolecular layer 12 thus was formed such that it was covalently bonded to the substrate surface. The covalent bond is via a siloxane bond.

Subsequently, the substrate was washed well using a non-aqueous solvent, e.g., chloroform. The formation of the chemically adsorbed monomolecular film was measured by FTIR spectrometry and the thickness was about 1.5 nanometers (nm). It was firmly bonded such that it did not separate.

The substrate was then dipped in a chloroform solution containing pyrrole (or thiophene or aniline) at a concentration of about 5 wt. %, thus bringing about a hydrochloric acid elimination reaction (i.e., a dehydrochlorination reaction) between —SiCl groups remaining on the substrate surface and the >NH groups of pyrrole. Thus, molecules represented by the formula [13]:

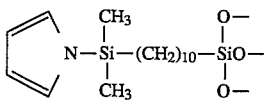

[Formula 13]

each having a pyrrolyl group 13 were secured by chemical bonds to the substrate via the chemically adsorbed monomolecular layer 12, as shown in FIG. 2(c).

Thereafter, the substrate was washed well with an organic solvent and then dipped in 0.1 mol/l lithium perchlorate-acetonitrile solution for bringing about polymerization along the layer surface at 10 V and at a current density of 2 mA/cm². Thus, a functional chemically adsorbed layer 15 having an electric conductivity of about $10^{-1}$ S/cm and containing pyrrolylene bonds was formed on the layer surface, as shown in FIG. 2(d). In the above examples 1 and 2,

and

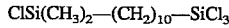

were used as the surface active material having chlorosilyl groups at molecule ends. It was also possible to use the compounds by the formulas [14] to [15]:

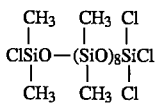

[Formula 14]

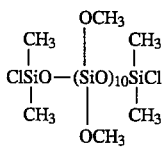

[Formula 15]

and so forth.

EXAMPLE 3

A polycarbonate substrate having a thickness of 1.2 mm and a diameter of 120 mm. The substrate thus obtained was oxygen plasma treated in a UV dry stripper ("UV-1" manufactured by Samco International) at an oxygen flow rate of 1 l/min for 10 minutes, thus oxidizing the polycarbonate substrate surface. The substrate was then dipped and held for about 30 minutes in a solution prepared by dissolving 1% by weight of a material containing a plurality of chlorosilyl groups (e.g., SiCl₄ being small in molecular size and greatly reactive with respect to hydroxyl groups), thus rendering the surface uniformly hydrophilic in a non-aqueous solvent (e.g., freon 113 solvent). As a result, a dehydrochlorination reaction was brought about due to hydrophilic —OH groups more or less present at the surface of the substrate, whereby a chlorosilane monomolecular film of the material containing a plurality of trichlorosilyl groups was formed.

As an example, using SiCl₄ as the material containing a plurality of trichlorosilyl groups, a dehydrochlorination reaction was brought about on the surface due to a small quantity of hydrophilic —OH groups being exposed at the substrate surface. Molecules represented by formulas [16] and/or [17] were formed.

[Formula 16]

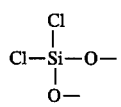

[Formula 17]

Those bonds were connected to the substrate surface by —SiO— bonds.

Subsequently, the substrate was washed with a non-aqueous solvent (e.g., freon 113 to remove unreacted SiCl₄ molecules) and then with water thus obtaining a siloxane monomolecular film at the substrate surface as shown by formulas [18] and/or [19].

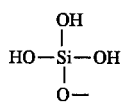

[Formula 18]

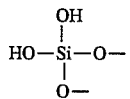

[Formula 19]

The above example was repeated except that the washing step with the freon 113 was omitted, and a siloxane-based polymer film was adsorbed to the substrate. The siloxane-based polymer film was in satisfactorily close contact with the substrate.

The monomolecular film was completely bonded by chemical bonds of —SiO— to the part surface and did not separate. In addition, its surface contained numerous silanol (—SiOH) bonds corresponding to about three times the initial number of hydroxyl groups.

And then, a substrate provided with a monomolecular film formed on its surface and containing numerous —SiOH bonds, was dipped and held for about one hour in a non-aqueous solution containing a material containing chlorosilyl groups, e.g., a freon-113 containing about 3 wt. % of a material containing two chlorosilyl groups at molecule ends, for example,

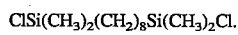

Since the siloxane inner layer had many hydroxyl groups, a dehydrochlorination reaction was brought about between —SiCl groups at either molecular end of the material having chlorosilyl (—SiCl) groups and the hydroxyl groups of the inner layer, thus producing bonds represented as above in formula [4] over the entire inner layer surface. A laminated monomolecular layer thus was formed such that it was covalently bonded to the inner layer surface. The covalent bond is via a siloxane bond.

Subsequently, the substrate was washed well using a non-aqueous solvent, e.g., freon 113. The formation of chemically adsorbed laminated monomolecular film was measured by FTIR spectrometry and the thickness was about 2.5 nanometers (nm). It was firmly bonded such that it did not separate.

Then the substrate was dipped and held in a non-aqueous solution containing functional molecules, e.g., a freon 113 solution prepared by dissolving a diacetylene compound represented by the formula:

$$CH_3-C\equiv C-C\equiv C-OH$$

to a concentration of about 5 wt. %, thus bringing about a dehydrochlorination reaction between —SiCl groups remaining on the laminated film surface and the —OH groups of the diacetylene compound. Thus, molecules represented as above in formula [5] and each having a diacetylene group were secured by chemical bonds to the substrate via the chemically adsorbed laminated monomolecular layer.

Thereafter, the substrate was washed well with an organic solvent (i.e., a freon 113 solution) and then irradiated with ultraviolet rays of about 100 mJ. Thus, a functional chemically adsorbed laminated layer was obtained, which contained polyacetylene bonds produced by polymerization of adjacent diacetylene groups and had a third non-linear optical effect.

As has been shown in Examples 1 to 3, in the functional laminated chemically adsorbed film according to the invention, functional molecules are secured by chemical bonds to the substrate via a chemically adsorbed monomolecular layer formed in advance. Thus, compared to the prior art of introducing functional groups in advance into the material for chemical adsorption, an increased freedom of incorporation of functional groups can be obtained, and it is possible to manufacture a functional laminated chemically adsorbed film having a desirable function comparatively freely. In addition, it is possible to obtain thin and durable functional laminated chemically adsorbed films. The functional laminated chemically adsorbed films having desired functions may be obtained without need of introducing any functional groups in advance into the material for chemical adsorption.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

What is claimed is:

1. A chemically adsorbed functional film comprising:
   A) a substrate;
   B) an inner portion formed of straight chain molecules, which comprise Si atoms at opposing ends of each straight chain; and
   C) an outer functional portion, which comprises functional organic groups, wherein said functional organic groups are selected from the group consisting of conductive groups and photofunctional groups;
   wherein said Si atoms at the first ends of said inner portion bond covalently with the outer functional portion and Si atoms at second ends opposing the first ends of the straight chain molecules of said inner portion bond covalently with the substrate.

2. The chemically adsorbed functional film according to claim 1, wherein said inner portion is indirectly bonded by covalent bonds to the substrate via a siloxane monomolecular film or a siloxane-based polymer film.

3. The chemically adsorbed functional film according to claim 1 or 2, wherein said said inner portion is represented by the formula:

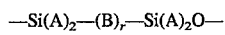

$$-Si(A)_2-(B)_r-Si(A)_2O-$$

where r represents an integer in a range from 1 to 30, A represents a lower-alkyl group having 1 to 6 carbons, a lower-alkoxy group having 1 to 6 carbons, or an aryl group, and B represents a carbon chain, an oxygen-containing carbon chain, a nitrogen-containing carbon chain, or a silicon-containing carbon chain.

4. The chemically adsorbed functional film according to claim 1 or 2, wherein said inner portion is selected from the group consisting of Formulas 5, 6, 7 and 8; wherein Formula 5 is represented by:

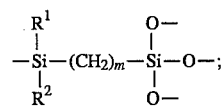

Formula 5

Formula 6 is represented by:

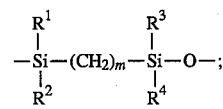

Formula 6

Formula 7 is represented by:

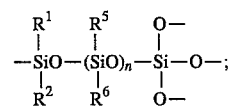

Formula 7 and Formula 8 is represented by:

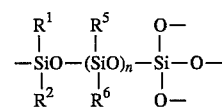

Formula 8 where $R^1$, $R^2$, $R^3$, $R^4$, $R^5$, $R^6$ each represent a lower-alkyl group having 1 to 6 carbons, or an aryl group, and m and n are each an integer in a range from 1 to 30.

5. A chemically adsorbed functional film comprising:
   A) a substrate;
   B) an inner portion formed of straight chain molecules, which comprise Si atoms at opposing ends of each straight chain; and
   C) an outer functional portion having functional organic groups, wherein said functional organic groups are selected from the group consisting of aromatic compounds, and heterocyclic compounds;
   wherein said Si atoms at the first, ends of said inner portion bond covalently with the outer functional portion and Si atoms at second ends opposing the first ends of the straight chain molecules of said inner portion bond covalently with the substrate.

6. The chemically adsorbed functional film according to claim 5, wherein said inner portion is indirectly bonded by covalent bonds to the substrate via a siloxane monomolecular film or a siloxane-based polymer film.

7. The chemically adsorbed functional film according to claim 5 or 6, wherein said inner portion is represented by the formula:

$$-Si(A)_2-(B)_r-Si(A)_2O$$

where r represents an integer in a range from 1 to 30, A represents a lower alkyl group having 1 to 6 carbons, a lower alkoxyl group having 1 to 6 carbons, or an aryl group, and B represents a carbon chain, an oxygen-containing carbon chain, a nitrogen-containing carbon chain or, a silicon-containing carbon chain.

8. The chemically adsorbed functional film according to claim 5 or 6, wherein said inner portion is selected from the group consisting of Formulas 5, 6, 7, and 8; wherein Formula 5 is represented by:

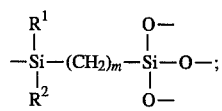  Formula 5

Formula 6 is represented by:

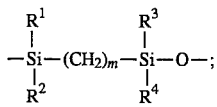  Formula 6

Formula 7 is represented by:

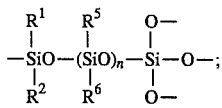  Formula 7 and Formula 8 is represented by:

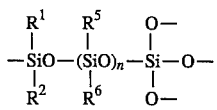  Formula 8 where $R^1$, $R^2$, $R^3$, $R^4$, $R^5$, and $R^6$ each represent a lower-alkyl group having 1 to 6 carbons or an aryl group; and m and n are each integers in a range from 1 to 30.

* * * * *